United States Patent
Dubé

(10) Patent No.: US 9,042,047 B1
(45) Date of Patent: May 26, 2015

(54) MITIGATING WRITE FAULTS ARISING FROM DISTURBED LUBRICATION EVENTS

(71) Applicant: Seagate Technology LLC, Cupertino, CA (US)

(72) Inventor: Mark Gerald Dubé, Savage, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 14/506,315

(22) Filed: Oct. 3, 2014

(51) Int. Cl.
*G11B 5/02* (2006.01)
*G11B 5/012* (2006.01)

(52) U.S. Cl.
CPC ....................................... *G11B 5/012* (2013.01)

(58) Field of Classification Search
CPC ........ G11B 5/012; G11B 5/00; G11B 5/6005; G11B 5/59633; G11B 5/54; G11B 27/36
USPC ................. 360/55, 25, 75, 31, 97.12
See application file for complete search history.

(56) References Cited

U.S. PATENT DOCUMENTS

| | | | |
|---|---|---|---|
| 5,751,517 A | 5/1998 | Agarwal | |
| 6,097,559 A | 8/2000 | Ottesen et al. | |
| 6,310,741 B1 | 10/2001 | Nishida et al. | |
| 6,853,508 B2 | 2/2005 | Smith et al. | |
| 6,989,671 B2 | 1/2006 | Zhu et al. | |
| 7,423,828 B2 | 9/2008 | Emo et al. | |
| 7,982,987 B2 | 7/2011 | Deng et al. | |
| 8,218,266 B2 * | 7/2012 | Shimizu et al. | 360/235.8 |
| 8,665,546 B1 | 3/2014 | Zhao et al. | |
| 8,711,508 B2 | 4/2014 | Kurita et al. | |
| 2008/0278835 A1 | 11/2008 | Dakroub et al. | |

* cited by examiner

*Primary Examiner* — Nabil Hindi
(74) *Attorney, Agent, or Firm* — Hall Estill Attorneys at Law (57) ABSTRACT

Apparatus and method for detecting and compensating for lubrication disturbance (lube disturb) events on a rotatable data recording medium. In some embodiments, a lube disturb event is detected responsive to displacement of a data transducer away from a first memory location on a rotating data recording medium during a write operation to write data thereto. The lube disturb event arises responsive to a transfer of accumulated contamination from a data transducer to a lubrication layer on the rotating data recording medium and a smearing of the transferred accumulated contamination along the first memory location. The write data are stored to a different, second memory location instead of to the first memory location responsive to the detected lube disturb event.

20 Claims, 4 Drawing Sheets

FIG. 9 under review

Of particular interest is an intermittently observed phenomenon sometimes referred to as lubrication disturbance (lube disturb). Lube disturb arises as contaminants accumulate and coalesce on a slider and then are transferred to the media surface. The contaminants can take a variety of forms, including airborne hydrocarbon vapor (material) such as from leaked spindle motor oil and the disc surface lubrication. At this point it will be noted that terms such as "airborne" and "air bearing surface" are used herein with reference to the internal atmosphere of a device, irrespective of whether the fluid making up the internal atmosphere is technically "air" in the conventional sense (e.g., mixture of nitrogen, oxygen, argon, carbon dioxide, water vapor, etc.). For example, contaminants suspended in a helium or other inert environment are considered to be "airborne" for purposes herein.

Over time, the airborne contaminants can collect as one or more relatively large droplets of contamination on the slider. The droplets can subsequently release onto the data recording surface and be "smeared" by subsequent contact with the slider. This smearing action locally disturbs the disc lubrication and can induce a number of undesired off-track positional responses such as high frequency vertical and horizontal modulation of the slider. The displacement of the slider is often of sufficient magnitude as to temporarily prevent the transducer from enabling the writing of data to that location.

Lube disturb effects are highly localized from both a time and a proximity standpoint. The disc lubrication is normally designed to nominally coat the recording surface at a uniform thickness and absorb or otherwise encapsulate contaminating particles that come into contact with the lubrication layer. Due to the fluidic properties of the lubrication and the high speed rotation of the discs, lube disturb effects tend to have a relatively short decay period (e.g., on the order of about one second or so). Thus, a lube disturb event can manifest itself as a localized off-track disturbance at a particular location that seemingly arises from nowhere and, after a relatively short recovery period (e.g., about one second or so), automatically resolves itself without further incident or action on the part of the data storage device.

Various embodiments of the present disclosure are generally directed to an apparatus and method for detecting and compensating for lubrication disturbances (lube disturb). As explained below, some embodiments include moving a data transducer to a target track on a data recording medium and initiating a write operation to write data to the target track. The write operation is aborted responsive to detection of physical displacement of the transducer indicative of a lube disturb condition. The data are thereafter written to a new memory location, such as a newly selected target track, a media cache, a solid-state memory, etc., responsive to characterization of the write fault being induced by a lube disturb event.

In some cases, the new memory location becomes the newly allocated final location for the data. In other cases, a subsequent data transfer operation takes place to migrate the data back to the target track. Evaluation operations can take place to determine that the target track has "healed" and is available for the storage of new data, thereby confirming the disturbance during the initial writing was due to a lube disturb event.

Figure 1:
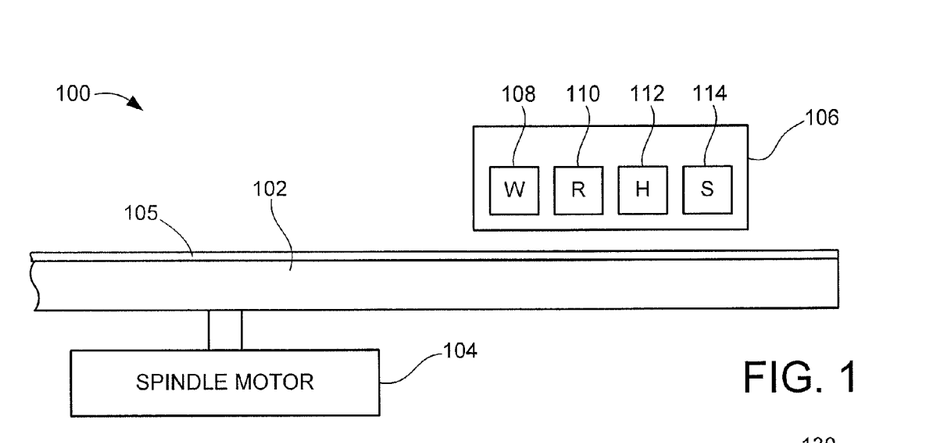

These and other features of various embodiments can be understood beginning with a review of FIG. 1 which provides a generalized functional block diagram of relevant aspects of an exemplary data storage device 100.

The data storage device 100 includes one or more rotatable data recording media (e.g., discs) 102 that are rotated during operation at a constant high speed by a spindle motor 104.

Each recording surface of the media 102 is coated with a lubrication layer 105 comprising a thin layer of hydrocarbon-based fluid. The lubrication layer 105 provides a number of benefits, including contaminant absorption and friction reduction through inadvertent contact with an adjacent data transducer 106.

The exemplary transducer 106 in FIG. 1 is shown to include one or more write (W) elements 108 and one or more read (R) elements 110 adapted to respectively write data to and read data from the associated recording surface. A heater (H) 112 may be adapted to adjust the fly height of the transducer through thermal expansion effects, and one or more proximity sensors (S) 114 detect proximity and/or contact between the transducer 106 and the medium 102.

Figure 2:
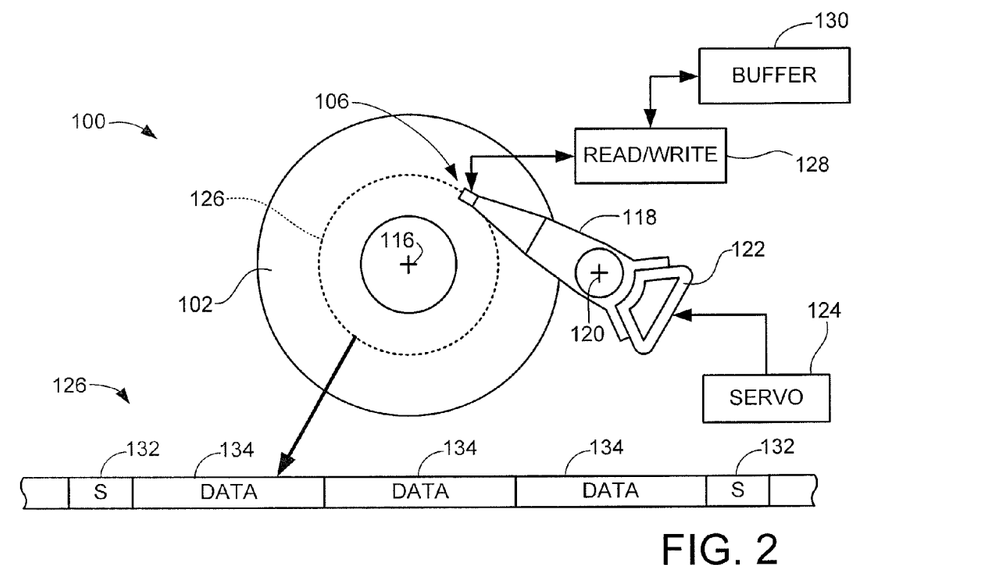

FIG. 2 shows additional aspects of the storage device 100 of FIG. 1. The magnetic recording medium 102 is rotated by the spindle motor 104 (FIG. 1) about a central axis 116. An actuator 118 is disposed adjacent an outermost peripheral edge of the disc(s) 112 and pivots about a pivot point 120.

The transducer 106 (FIG. 1) is mounted at a first end of the actuator 118, and a voice coil 122 of a voice coil motor (not separately shown) is mounted at an opposing second end of the actuator. Controlled application of current to the voice coil 122 by a servo control circuit 124 induces controlled rotation of the actuator and hence, alignment of the transducer 126 with tracks defined on the media surfaces. One exemplary track is represented at 126. Write data to be written to the track 126 during a write operation are supplied to the write element 108 via a read/write circuit 128, and read back signals transduced by the read element 110 during a read operation are recovered and processed by the circuit 128 to return the originally stored data. An input data buffer 130 can temporarily store the input write data and output read data.

The tracks 126 may take an embedded servo format as shown in FIG. 2 so that the media surfaces are provisioned with spaced apart servo (S) data fields 132. The servo data fields 132 provide position control information to the servo control circuit 124 to enable closed-loop control of the transducer 106. Data blocks 134, such as in the form of fixed-sized addressable sectors, are stored along the tracks 126 between adjacent pairs of the servo fields 132. While three (3) data blocks 134 are shown in FIG. 2, any number of data blocks, including partial data blocks, may be provided between adjacent pairs of the servo fields 132.

While not limiting, it is contemplated that user data from a host device are stored in the data blocks (sectors) 134. The data are stored using perpendicular magnetic recording techniques so that the write element 108 of the transducer 120 applies a time varying bi-directional write field to the track 126 to write the data in perpendicular domains (e.g., perpendicular to the direction of travel of the head relative to the disc). Other recording techniques can be applied including heat assisted magnetic recording (HAMR), microwave assisted magnetic recording (MAMR), longitudinal recording, bit patterned media recording, discrete track media recording, shingled (e.g., partially overlapping) track recording, two dimensional magnetic recording (TDMR), multi-sensor magnetic recording (MSMR), etc.

Figure 3A:
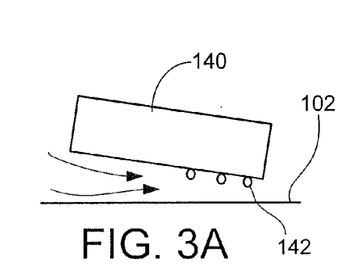
Figure 3B:
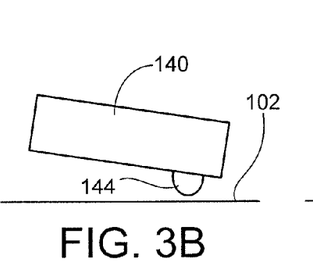
Figure 3C:
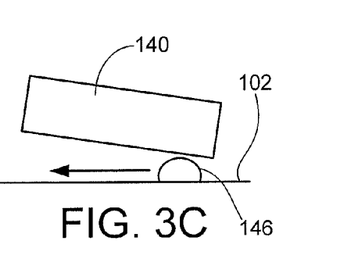

FIGS. 3A-3C show a simplified schematic depiction of a slider 140 of the data storage device 100 to illustrate a lubrication disturbance (lube disturb) event. It will be appreciated that the views in FIGS. 3A-3C are merely representational in nature and are not drawn to scale.

As shown by FIG. 3A, airborne contaminants (represented generally at 142) such as hydrocarbon based particulates and fluids from various internal sources pass along the fluidic flow established by the high speed rotation of the media 102 and enter the high pressure zone between the slider 140 and the media. The contaminants 142 accumulate onto the air bearing portion(s) of the slider 140 in the form of relatively small droplets. In some cases, over time the contaminants continue to accumulate and may coalesce into one or more larger droplets 144, as represented in FIG. 3B.

At some point the droplet(s) 144 will achieve sufficient size/mass/surface area as to become dislodged from the slider 140 and fall or otherwise be transferred to the data recording surface of the media 102 as a localized contaminant 146, as represented in FIG. 3C. The resulting size and shape of the localized contaminant 146 will vary, but generally, the contaminant will be of sufficient magnitude to contactingly interact with the slider 140 and be spread out, or "smeared," along the track as the media continues to rotate adjacent the slider. Depending upon the magnitude of the contaminant 146, a significant extent of the circumferential length of the track may receive portions of the smeared contaminant droplet. Stated another way, once transferred to the media 102, the transferred contaminant 146 may wind up being spread over many consecutive data sectors 134 (FIG. 2) along the track.

This spreading of the transferred contaminant can trigger a number of effects. Just as an automobile driving at high speed can undergo significant instabilities when suddenly encountering a deep puddle of water, the slider can similarly encounter a number of instabilities including high frequency vertical and/or horizontal displacement as the slider contacts and spreads the transferred contaminant. The smearing of the contaminant disturbs the existing layer of lubrication 105 (see FIG. 1) causing displacements of the lube material, changes in lube thickness, ripples, etc. In this way, a previously stable flying environment can become temporarily unstable through the localized introduction of the additional volume of fluid transferred from the slider to the media.

Those skilled in the art will recognize that, to perform a write operation, servo circuits such as 124 in FIG. 2 often execute a seek operation to move the transducer 106 to a target track 126 having the destination data sector(s) 134 to which the data are to be written. A servo qualification operation can be carried out as the transducer 106 settles onto the target track and enough servo fields 132 are sensed to ensure that the transducer 106 is in a qualified track following mode within existing limits (sometimes referred to as off-cylinder limits, OCLIM or write fault thresholds, WFT) about the center of the track. Typical OCLIM values may be on the order of about ±15% of the width of the track as measured from the center (or other reference point) on the track.

Usually, the angular location(s) of the destination data sectors 134 are selected such that the system has sufficient time to move the associated transducer to the target track so as to be ready to write the data within the rotational latency period required for the destination sectors 134 to rotate around to the data transducer. While not necessarily limiting, it is believed that the high speed deceleration of a transducer such as 106 can serve to dislodge large droplets of contaminant material such as 144 and induce lube disturb events, so that the instabilities are often (albeit not always) exhibited during initial servo qualification operations at the commencement of a seek operation once the transducer reaches the target track. If the instabilities are sufficiently large so as to exceed the OCLIM thresholds, the write operation is aborted until the off-track errors can be reduced to acceptable limits.

Normally, OCLIM thresholds can be exceeded for a variety of reasons, so that conventional systems are often configured to execute one or more write retry operations if a write fault condition is declared. That is, if a write fault is declared, the system stays on track and waits a revolution (or more) for the target sectors 134 to once again rotate around to the transducer 106 and the system tries again to write the data to the target location. Other corrective actions may be taken as well in an effort to resolve a write fault condition.

Regardless, most conventional systems have a timeout period after which, if the data have not been successfully written to the target location, a write error status is returned to the host signifying that the data were not successfully written.

Based on the fluidic flow characteristics of the lube and the forces supplied by the high speed rotation of the media, the localized smearing effect caused by the contaminant 146 will clear and the lubrication layer 105 in the vicinity of the target location will return to a smooth, stable surface, allowing data to be reliably written to this location. A problem with this approach is that the recovery time for a typical lube disturb event is relatively longer than for some other types of transitory sources of off-track errors that are quickly eliminated (e.g., a single shock event, etc.), but not so long as to continue for an extended period of time as with other types of extended sources (e.g., an ongoing vibratory environment, etc.). While the timeout period can vary, one exemplary timeout period for a lube disturb event may be on the order of several hundred microseconds, ms.

Figure 4:
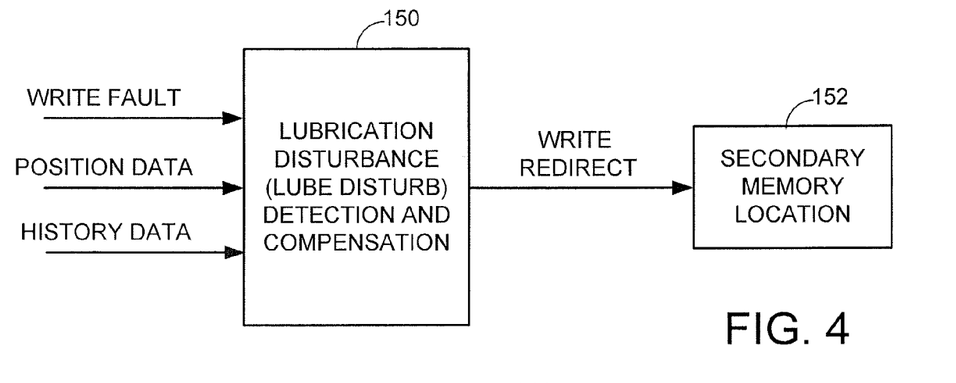

Accordingly, FIG. 4 is a functional block representation of a lubrication disturbance (lube disturb) detection and compensation module 150 operative in accordance with various embodiments to detect and compensate for lube disturb effects as discussed in FIGS. 3A-3C. The module 150 can take a variety of forms, including hardware, software and/or firmware elements. In some cases, the module 150 is incorporated into a top level controller of the storage device. In other cases, the module 150 is incorporated into the servo circuit 124 (FIG. 2).

Generally, the module 150 monitors device operation and analyzes a number of inputs to identify the presence of a lube disturb event. If a lube disturb event is detected, the module 150 directs the system to redirect the writing of the data from a first memory location to a new, secondary memory location 152. As discussed in detail below, the secondary memory location can be a temporary location for the data or a permanent location for the data. If the secondary memory location is a temporary location, the module 150 subsequently directs a background data migration operation to move the data to the initially targeted first memory location. If the secondary location becomes the permanent location for the data, the module 150 can carry out an evaluation of the first memory location and, if successful, reallocate the first memory location for the storage of other, new data by the system.

The module 150 is shown to receive a number of inputs including write fault indications, position data and history data. Other inputs can be used. In some cases, the declaration of a write fault signals the module 150 to commence with evaluation of the occurrence to determine whether the cause is a lube disturb event. The position data may include sensed position displacement data (including position error signal, PES values) from the servo circuit as well as output displacement signals from other sensors such as fly height proximity sensors (e.g., 114 in FIG. 1).

In some cases, empirical data may be accumulated and compared to the off-track displacement profile experienced by a given slider 140 to characterize the event as a lube disturb event. Long term trend data indicative of the gradual accumulation of contamination onto the slider (see e.g., FIG. 3B) followed by a step-change increase in localized displacement (FIG. 3C) may also be used by the module in evaluating the event. The duration of the event, such as the continued instability of the transducer over multiple successive revolutions of the media 102 may also factor into the classification of the event as a lube disturb event.

History data regarding the previous performance of the slider under evaluation can also be used. It has been found in some cases that the occurrence of lube disturb is a relatively infrequent event, in that a given slider may experience a long period of stability, followed by a shorter period of increasing instability, followed by a catastrophic episode (e.g., transfer and smearing operation as in FIG. 3C). Tracking such repeating cycles over time can enable the module to adaptively predict an occurrence is happening or may happen in the near future. While not specifically illustrated in FIG. 4, a predicted upcoming lube disturb event can be potentially averted by the module 150 by directing a seek to a guard band or other non-critical location on the media in hopes of dislodging the contaminant droplets (see FIG. 3B) prior to a write operation.

Regardless, upon classifying an encountered disturbance event as a lube disturb event, the module 150 can expedite processing of the pending write data to enable the system to move on instead of wasting time trying to clear the existing fault, or worse, allowing all servo retries to occur resulting in a host reported error condition. The module 150 does this by interrupting any further write retries or other corrective actions normally taken by the device 100 and instead directing the device to write the data elsewhere (e.g., the secondary memory location). In the event that the module 150 determines that the write fault condition is caused by a normal displacement event, the module 150 can direct the write circuitry (e.g., 128 in FIG. 2) to continue to attempt to write the data to the first memory location (e.g., continue processing write retries or other actions in an effort to write the data to the first memory location).

The secondary memory location 152 identified by the module 150 can take a variety of forms. In some cases, the module 150 directs the servo circuit 124 (FIG. 2) to advance the transducer 106 to a new, different target track on the medium (or other medium surface) sufficiently far enough away from the existing location that the lube disturb effects will not have affected the new location. The write circuitry (e.g., 128, FIG. 2) thereafter writes the data to the new, different target track.

Figure 5:
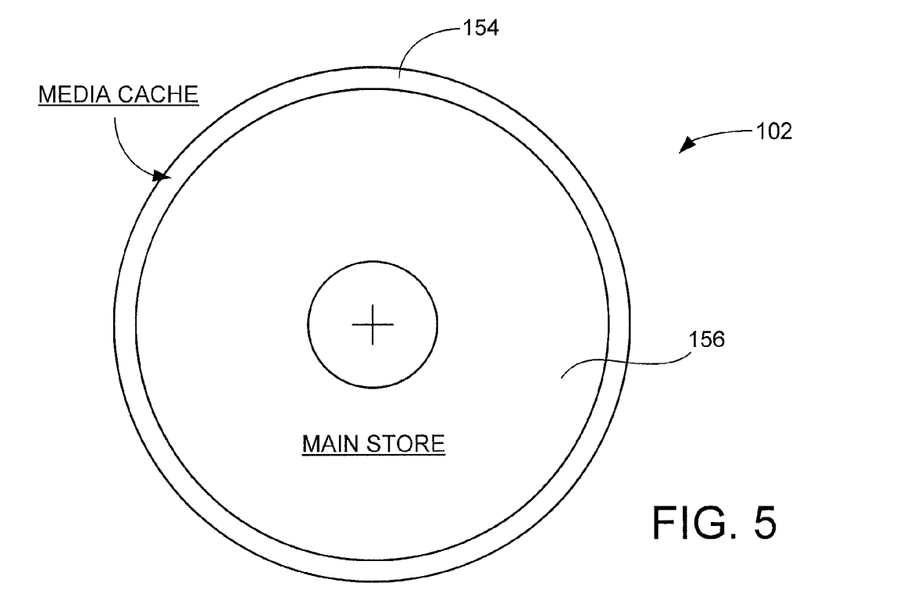

In other cases, a specially configured media cache 154 may be provided to store the data, as generally illustrated in FIG. 5. The media cache 154 can comprise a band of tracks at a selected location, such as but not limited to the outermost diameter (OD) of the media 102. The media cache 154 may be used for various purposes such as to receive streamed data at a relatively high transfer rate, or to store data classified as "hot" data normally requested on a frequent basis by the host. A media cache such as 154 thus provides a ready location to receive the pending write data, which can be transferred from the input buffer 130 (see FIG. 2). Generally, the data are only temporarily stored in the media cache 154 pending transfer for longer term storage to tracks in a main store portion 156 of the media 102, either to the original target track or to a new destination track.

Figure 6:
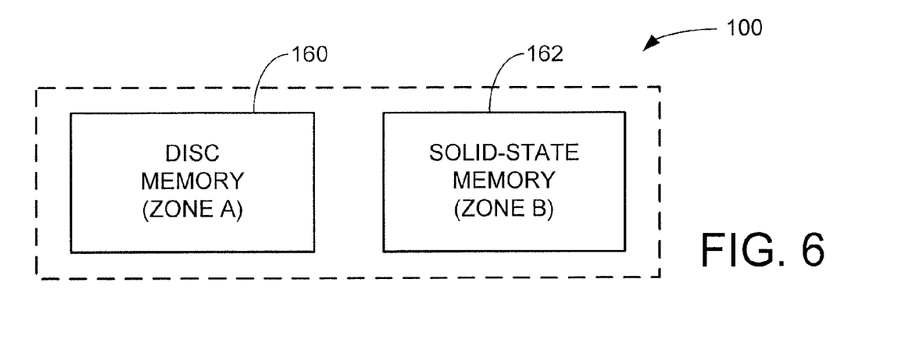

Other forms of available memory for the secondary memory location 152 in FIG. 4 may include solid-state memory, as generally illustrated in FIG. 6. More specifically, FIG. 6 provides the storage device 100 as a hybrid device with both disc (rotatable magnetic recording media) 160 and solid-state memory 162. The solid-state memory is formed of an array of non-volatile memory cells such as but not limited to flash memory, spin-torque transfer random access memory (STRAM), resistive random access memory (RRAM), magnetic random access memory (MRAM), phase change random access memory (PCRAM), etc. As before, the write data can remain in the solid-state memory 162 or be subsequently transferred to the disc memory 160.

Figure 7:
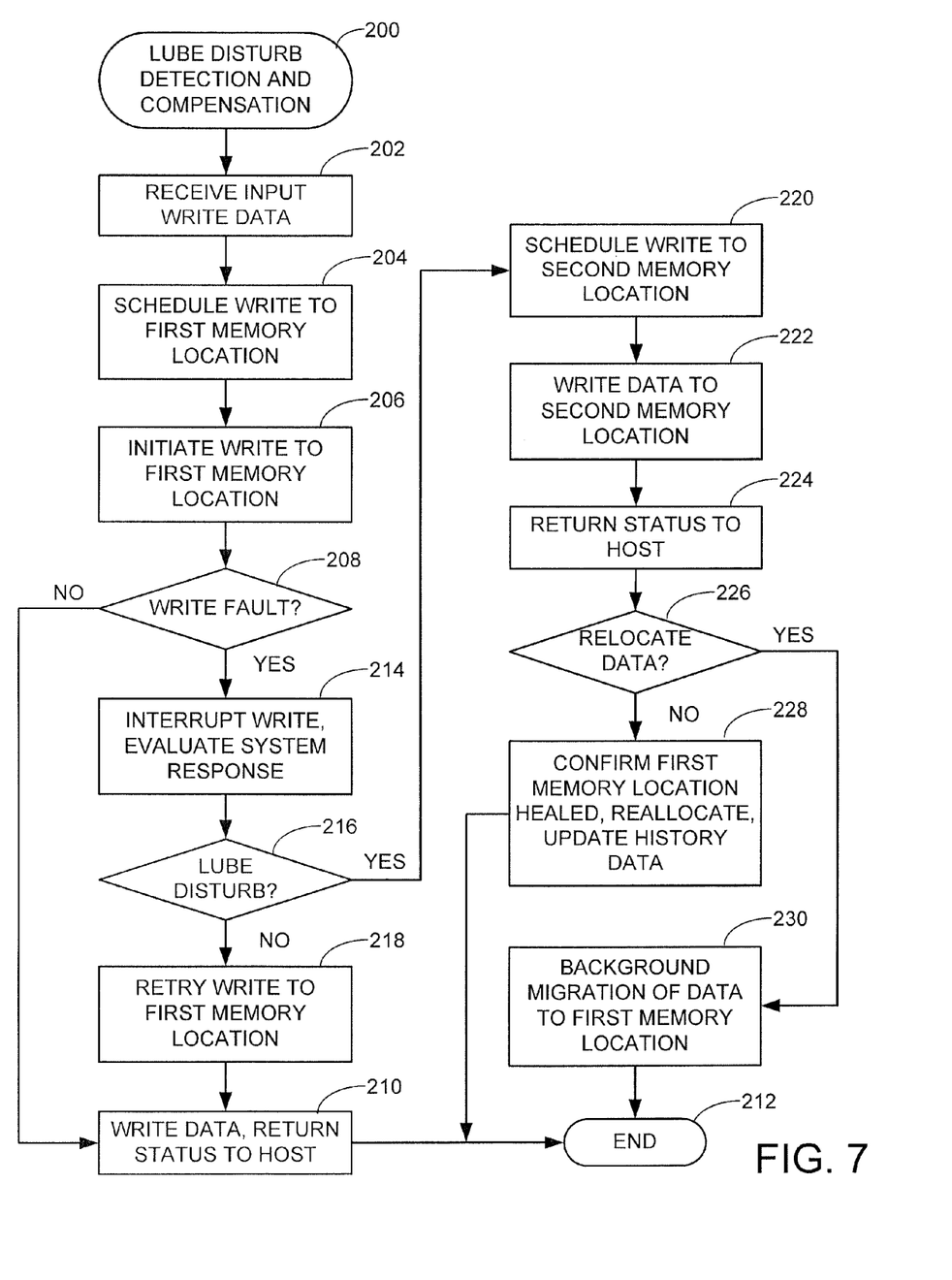

FIG. 7 is a flow chart for a lube disturb detection and compensation routine 200 illustrative of steps carried out in accordance with the foregoing discussion. It is contemplated that the various steps will be carried out by the exemplary data storage device 100 under the direction of the module 150 in FIG. 4. The various steps set forth in FIG. 7 are merely exemplary and can be omitted, modified, appended, performed in a different order, etc. The routine 200 follows the process flow for a single write command, but it will be understood that many additional pending write commands, as well as pending read commands, may be concurrently processed, scheduled and executed by the device 100.

As shown in FIG. 7, the process commences at step 202 with the receipt of a write command from an associated host device. The write command can take a variety of forms depending on the configuration of the system, but will generally involve a command component and a data component. The command component includes a write instruction, a logical, virtual or block identification, and any other necessary information for the device 100 to properly interpret and execute the command. The data component includes a set of input write data to be written to the device 100. The input write data are temporarily stored in the input buffer memory 130 (FIG. 2).

The device 100, by way of a process controller or other control module, schedules the writing of the input write data to a first memory location by the write circuitry 128 (FIG. 2). This can include identifying a predetermined or next available location on the media 102 to which the data can be written. Various other preliminary steps may be taken at this time, including the application of encoding to the data (e.g., error detection and correction codes, encryption, run length limited codes, etc.). Other processing can be applied as well such as the queuing of the command among other pending commands for efficient order sequencing.

The device 100 proceeds to initiate a write operation at step 206 to transfer the encoded write data to the media 102. As discussed above, this can include a seek operation to move the associated write transducer 106 to the target track (e.g., 126, FIG. 2), as well as a servo qualification operation and a track following operation pending advancement of the target data sector(s) 134 (FIG. 2) to the transducer.

Decision step 208 determines whether a write fault is declared during the write operation. As discussed above, a write fault (OCLIM event) may be declared if off-track radial displacement exceeds the OCLIM thresholds. In some cases, a write fault may be declared if vertical displacement is sensed and found to exceed certain fly height thresholds irrespective of whether the transducer is exceeding the OCLIM thresholds. Some systems have separate detection mechanisms to detect and declare different coded errors for these and other types of displacement errors.

It is contemplated that, in the vast majority of write operations, no write faults will be declared. The flow in FIG. 7 accordingly passes from decision step 208 to step 210 where the data are written and the device 100 supplies a write complete status to the host indicating that the write was successfully completed. If writeback caching is used, such declaration may have previously been supplied. The routine then ends at this point at 212.

Returning to decision step 208, if a write fault is encountered during the write operation, the system proceeds to determine whether the write fault is an intermittent displacement event or a persistent lube disturb event. This is carried out by immediately interrupting the write operation and evaluating the system response. As noted above, the module 150 in FIG. 4 may operate responsive to the declaration of the write fault to analyze various system parameters in an effort to determine whether a lube disturb event has occurred.

If not, as shown by decision step 216, the flow continues to step 218 where one or more write retries and other corrective actions are taken in an effort to complete the write operation. Normal processing is supplied at this point so that either the write operation will be successfully completed, as will likely be the case in most cases, or the write is not successfully completed. Either way, a return status is supplied to the host at step 210 and the process ends at 212 as before.

In the event the module 150 identifies the write fault to be caused by lube disturb, the process passes from step 216 to step 220 where the module 150 schedules a new write operation to write the pending input write data to the second memory location 152. As noted above, the second memory location can take a variety of forms, but in each case is selected as a memory location that is not affected by the localized lubrication disturbance of the first memory location.

The data are written to the second memory location at step 222, and a return status is forwarded to the host 224. In some cases, the host device may require identification of the location of the writing of the data, in which case the notification may include identification of this new location. In other cases, the device 100 may inform the host the data are written to the target location pending subsequent transfer thereto (analogous to a conventional writeback process).

Decision step 226 thus determines whether the written data are to be relocated. If not, additional analysis steps may be taken by the device at step 228 including evaluation of the first memory location. At a time of relatively lower I/O host demand, the device 100 may move the transducer 106 back to the first memory location to determine the flight characteristics of the slider. This may be carried out after waiting a predetermined period of time selected to enable full recovery of the disturbed lubrication, such as but not limited to a duration of at least 800 ms, 1200 ms, etc. If normal performance within acceptable thresholds is observed after this time interval, this further confirms that the characterization of the write fault as being due to a lube disturb event was correct, and this information can be used as history data by the module 150 during subsequent evaluations. The first memory location can also be reallocated and made available for storage of new data.

On the other hand, if data relocation is desired, the flow passes from step 226 to step 230 where a background migration of the data from the second memory location to the first memory location is carried out. This data migration will occur after a significant time period has elapsed to allow the lubrication to resume steady state conditions, which as before may be any suitable value such as but not limited to at least 800 ms, 1200 ms, etc.

Figure 8:
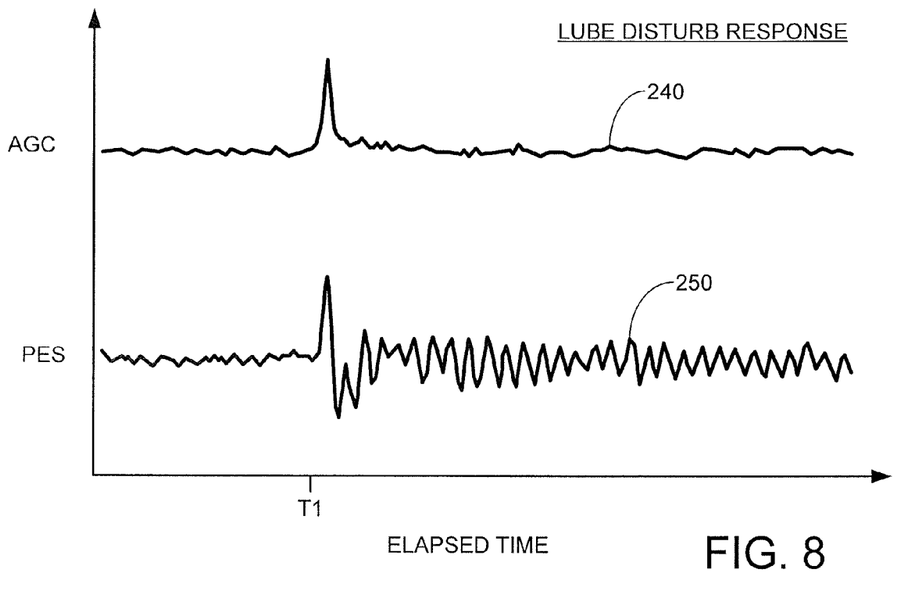

Empirical analyses can be used to classify responses as being due to lube disturb events versus non-lube disturb events. FIG. 8 shows an exemplary automatic gain control (AGC) response signal 240 and a position error signal (PES) 250 obtained by a storage device such as 100 in the presence of a lube disturb event. The signals 240, 250 are plotted against an elapsed time (or position) x-axis and a common amplitude y-axis. It will be appreciated that the signals 240, 250 are once-around signals that reoccur at each timing point (time T1) for a succession of media revolutions. In some cases, recurring signals such as in FIG. 8 may be present over a number of successive revolutions, such as 20-50 revolutions, with the peak amplitude gradually decaying over successive revolutions until steady state conditions are reestablished.

As will be appreciated, the AGC response signal 240 generally represents correction signals applied to AGC control circuitry of the read/write channel to maintain the amplitude of the readback signals in a normalized range. The PES 250 represents position error signals indicative of the distance of the read sensor from a selected reference point on the track, such as the track center. It can be seen that the lube disturb effect is manifested in this embodiment as a momentary peak in the AGC response signal 240 and moderate levels of oscillating positional error in the PES 250.

Figure 9:
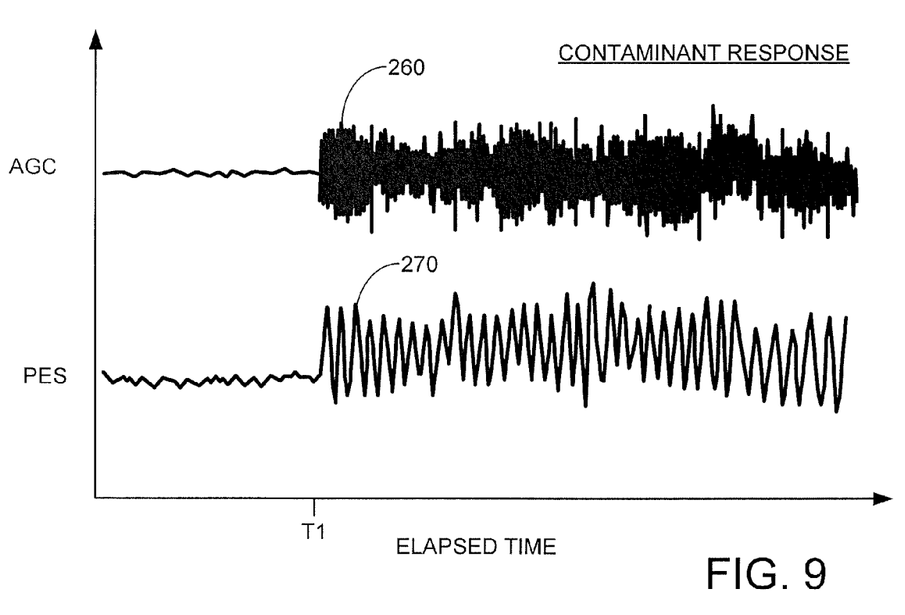

FIG. 9 provides an AGC response signal 260 and PES 270 obtained responsive to a contamination event where contaminants become persistently attached to or otherwise interact with the slider. Unlike the periodic and decaying signals 240, 250 in FIG. 8, the AGC and PES 260, 270 in FIG. 9 provide persistent and significant levels of noise that neither abate nor decay.

Thus, one way in which the detection and compensation module 150 (FIG. 4) can distinguish a lube disturb event is through monitoring the AGC and PES responses of the system. Other inputs can be provided as well, such as acceleration/shock inputs supplied from an accelerometer or other sensor, a timer, etc. A characteristic response such as illustrated in FIG. 8, in the absence of a corresponding mechanical shock event at time T1, could be used to affirmatively identify a lube disturb event. Other detection methodologies can readily be developed based on empirical analyses of individual systems.

It will be appreciated that the various embodiments presented herein can provide a number of operational benefits. The use of empirically derived and/or real-time parametric performance data can enable the device to characterize off-track events as caused by lube disturb, enabling the system to abandon further efforts to clear an existing fault condition and safely and efficiently store the pending write data elsewhere until the fault is cleared. The system is adaptive in that it can accumulate and track historical data over time to improve the ability to accurately detect lube disturb events. This in turn can provide other benefits as well, such as detecting an increase in the number of lube disturb events over time or in certain locations, indicative of a systemic reliability problem with the device in the form of intelligent reliability monitoring.

It is to be understood that even though numerous characteristics and advantages of various embodiments of the present disclosure have been set forth in the foregoing description, this description is illustrative only, and changes may be made in detail, especially in matters of structure and arrangements of parts within the principles of the present disclosure to the full extent indicated by the broad general meaning of the terms wherein the appended claims are expressed.

What is claimed is:

1. A method comprising:
  detecting a lubrication disturbance event responsive to displacement of a data transducer away from a first memory location on a rotating data recording medium during a write operation to write data thereto, the lubrication disturbance event arising responsive to a transfer of accumulated contamination from a data transducer to a lubrication layer on the rotating data recording medium and a smearing of the transferred accumulated contamination along the first memory location; and storing write data to a different, second memory location instead of to the first memory location responsive to the detected lubrication disturbance event.

2. The method of claim 1, further comprising moving the data transducer to a position adjacent the first memory location on the rotating data recording medium and initiating the write operation to transfer the data thereto, the displacement of the data transducer inducing a write fault condition that aborts the writing of the data to the first memory location.

3. The method of claim 1, further comprising waiting a predetermined period of time for the lubrication disturbance event to be resolved, followed by migrating the data written to the second memory location to the first memory location.

4. The method of claim 1, further comprising waiting a predetermined period of time for the lubrication disturbance event to be resolved, followed by moving the data transducer back to the first memory location and allocating the first memory location for storage of new data responsive to a displacement level of the data transducer falling below a predetermined threshold.

5. The method of claim 1, further comprising interrupting a writing of the data to the first memory location responsive to detected displacement of the data transducer with respect to the first memory location, the lubrication disturbance event detected responsive to the detected displacement of the data transducer.

6. The method of claim 1, the data transducer comprising a slider having an air bearing surface (ABS) adapted to hydrodynamically support the data transducer adjacent the rotatable data recording medium, the contamination accumulating on the ABS in a form of airborne hydrocarbon material.

7. The method of claim 1, the first memory location comprising a first track on the data recording medium, the second memory location comprising a different, second track on the data recording medium distal from the first track sufficient so as to be unaffected by the lubrication disturbance event.

8. The method of claim 1, the second memory location comprising a media cache adapted to temporarily store data pending transfer to a main store portion of the rotatable data recording medium.

9. The method of claim 1, the second memory location comprising a solid-state memory comprising a plurality of non-volatile memory cells.

10. The method of claim 9, the non-volatile memory cells characterized as at least a selected one of flash memory cells, spin-torque transfer random access memory (STRAM) cells, resistive random access memory (RRAM) cells, magnetic random access memory (MRAM) cells or phase change random access memory (PCRAM) cells.

11. An apparatus comprising:
a rotatable data recording medium;
a slider having an air bearing surface (ABS) adapted to interact with fluidic currents established by rotation of the medium to hydrodynamically support the slider adjacent thereto;
a servo circuit adapted to move the slider to a first memory location on the data recording medium to write data thereto; and
a lubrication disturbance detection and compensation module which, responsive to a displacement of the slider adjacent the first memory location, detects a lubrication disturbance event caused by a transfer of accumulated contamination from the data transducer to the lubrication layer adjacent the first memory location, and directs a writing of the write data to a different, second memory location responsive to the lubrication disturbance event.

12. The apparatus of claim 11, further comprising a write circuit which initiates a write operation to write the data to the first memory location and declares a write fault condition to interrupt the write operation responsive to the displacement of the slider adjacent the first memory location, the lubrication disturbance detection and compensation module using inputs from the write circuit and from the servo circuit to detect the lubrication disturbance event.

13. The apparatus of claim 11, the lubrication disturbance event caused by smearing the transferred accumulated contamination by the data transducer to displace a localized portion of the lubrication layer, the displacement manifested as at least a selected one of radial displacement of the slider parallel to a recording surface of the data recording medium and vertical displacement of the slider perpendicular to the recording surface of the data recording medium.

14. The apparatus of claim 11, the lubrication disturbance detection and compensation module waiting a predetermined period of time for the lubrication disturbance event to be resolved, followed by migrating the write data from the second memory location to the first memory location.

15. The apparatus of claim 11, the lubrication disturbance detection and compensation module waiting a predetermined period of time for the lubrication disturbance event to be resolved, followed by moving the data transducer back to the first memory location and allocating the first memory location for storage of new data responsive to a displacement level of the data transducer falling below a predetermined threshold.

16. The apparatus of claim 11, the first memory location comprising a first track on the data recording medium, the second memory location comprising a different, second track on the data recording medium distal from the first track sufficient so as to be unaffected by the lubrication disturbance event.

17. The apparatus of claim 11, the second memory location comprising a media cache adapted to temporarily store data pending transfer to a main store portion of the rotatable data recording medium.

18. The apparatus of claim 11, the second memory location comprising a solid-state memory comprising a plurality of non-volatile memory cells.

19. A data storage device, comprising:
a rotatable data recording medium;
a slider having an air bearing surface (ABS) adapted to interact with fluidic currents established by rotation of the medium to hydrodynamically support the slider adjacent thereto;
a servo circuit adapted to move the slider to a position adjacent a first memory location on the data recording medium;
a write circuit adapted to initiate a write operation to write data to the first memory location, the write circuit declaring a write fault to interrupt the write operation responsive to position data supplied by the servo circuit indicative of displacement of the slider away from the first memory location; and
a lubrication disturbance detection and compensation module which, responsive to the declared write fault, evaluates the position data from the servo circuit to characterize the displacement as caused by a lubrication disturbance event or a normal displacement event, the lubrication disturbance event comprising an accumulation of contamination onto the slider, a transfer of the accumulated contamination to the data recording medium and a smearing of the transferred accumulated contamination by the slider along the first memory location, the lubrication disturbance detection and compensation module directing the write circuit to write the data to a different, second memory location responsive to the lubrication disturbance event, and directing the write circuit to retry a write operation to the first memory location responsive to the normal displacement event.

20. The data storage device of claim 19, the second memory location comprising a cache memory, the lubrication disturbance detection and compensation module further adapted to, after a selected period of time, migrate the data from the cache memory to the first memory location, the selected period of time configured to constitute sufficient time to allow the disturbed lubrication to return to a steady state condition.

\* \* \* \* \*